US011926165B2

(12) United States Patent
Hosaka

(10) Patent No.: US 11,926,165 B2
(45) Date of Patent: Mar. 12, 2024

(54) IMAGE FORMING METHOD AND IMAGE FORMING APPARATUS

(71) Applicant: Shigetoshi Hosaka, Kanagawa (JP)

(72) Inventor: Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 17/696,170

(22) Filed: Mar. 16, 2022

(65) Prior Publication Data

US 2022/0297443 A1 Sep. 22, 2022

(30) Foreign Application Priority Data

Mar. 19, 2021 (JP) ................................ 2021-046170
Oct. 13, 2021 (JP) ................................ 2021-167905

(51) Int. Cl.
*B41J 2/21* (2006.01)

(52) U.S. Cl.
CPC .............. *B41J 2/211* (2013.01); *B41J 2/2117* (2013.01); *B41J 2/2132* (2013.01); *B41J 2/2146* (2013.01)

(58) Field of Classification Search
CPC .............................. B41J 2/2114; B41J 2/2117
See application file for complete search history.

(56) References Cited

U.S. PATENT DOCUMENTS

| | | | |
|---|---|---|---|
| 2007/0085869 A1 | 4/2007 | Hirano et al. | |
| 2007/0091135 A1 | 4/2007 | Hosaka et al. | |
| 2008/0018703 A1 | 1/2008 | Nakano et al. | |
| 2008/0068412 A1 | 3/2008 | Kikuchi et al. | |
| 2008/0117467 A1 | 5/2008 | Hosaka et al. | |
| 2008/0123146 A1 | 5/2008 | Ike et al. | |
| 2008/0137147 A1 | 6/2008 | Nakano et al. | |
| 2009/0080002 A1 | 3/2009 | Nakano et al. | |
| 2010/0141707 A1 | 6/2010 | Nakano et al. | |
| 2010/0231631 A1 | 9/2010 | Hosaka et al. | |
| 2011/0273746 A1 | 11/2011 | Hoshino et al. | |
| 2012/0314259 A1 | 12/2012 | Hosaka | |
| 2015/0254536 A1 | 9/2015 | Hosaka | |
| 2016/0026904 A1 | 1/2016 | Hosaka | |
| 2016/0236462 A1 | 8/2016 | Hosaka | |
| 2017/0210144 A1 | 7/2017 | Hosaka | |
| 2020/0023648 A1 * | 1/2020 | Gotou | B41J 2/145 |

FOREIGN PATENT DOCUMENTS

| | | | |
|---|---|---|---|
| CN | 114555378 A * | 5/2022 | B41J 2/2114 |
| JP | 2001246767 A * | 9/2001 | B41J 2/2114 |
| JP | 2009-212990 | 9/2009 | |
| JP | 2015-222323 | 12/2015 | |
| JP | 2021-066048 | 4/2021 | |

OTHER PUBLICATIONS

Fukui, MachineTranslationofCN-114555378-A, 2022 (Year: 2022).*
Irihara, Machine TranslationofJP-2001246767-A, 2001 (Year: 2001).*

* cited by examiner

*Primary Examiner* — Scott A Richmond
(74) *Attorney, Agent, or Firm* — Grüneberg and Myers PLLC

(57) ABSTRACT

An image forming method is provided that includes discharging, from a liquid discharged head, a white ink onto a recording medium to form a first layer having a first width, and a color ink onto the first layer to form a second layer having a second width. When the second width is equal to or smaller than a threshold, the first width is equal to the second width, and when the second width is larger than the threshold, the first width is smaller than the second width.

14 Claims, 13 Drawing Sheets

IMAGE FORMING METHOD AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2021-046170 and 2021-167905, filed on Mar. 19, 2021 and Oct. 13, 2021, respectively, in the Japan Patent Office, the entire disclosure of each of which is hereby incorporated by reference herein.

BACKGROUND

Technical Field

The present disclosure relates to an image forming method and an image forming apparatus.

Related Art

An apparatus that forms an image by depositing a discharged liquid (e.g., ink) onto a recording medium (e.g., fabric) is known. To well develop color with the color ink deposited on fabric, there is a case in which white ink is made to coat the fabric before the color ink is deposited thereon.

SUMMARY

Embodiments of the present invention provides an image forming method that includes discharging, from a liquid discharged head, a white ink onto a recording medium to form a first layer having a first width, and a color ink onto the first layer to form a second layer having a second width. When the second width is equal to or smaller than a threshold, the first width is equal to the second width, and when the second width is larger than the threshold, the first width is smaller than the second width.

Embodiments of the present invention provides an image forming apparatus that includes a liquid discharged head configured to discharge a white ink onto a recording medium to form a first layer having a first width, and a color ink onto the first layer to form a second layer having a second width. When the second width is equal to or smaller than a threshold, the first width is equal to the second width, and when the second width is larger than the threshold, the first width is smaller than the second width.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
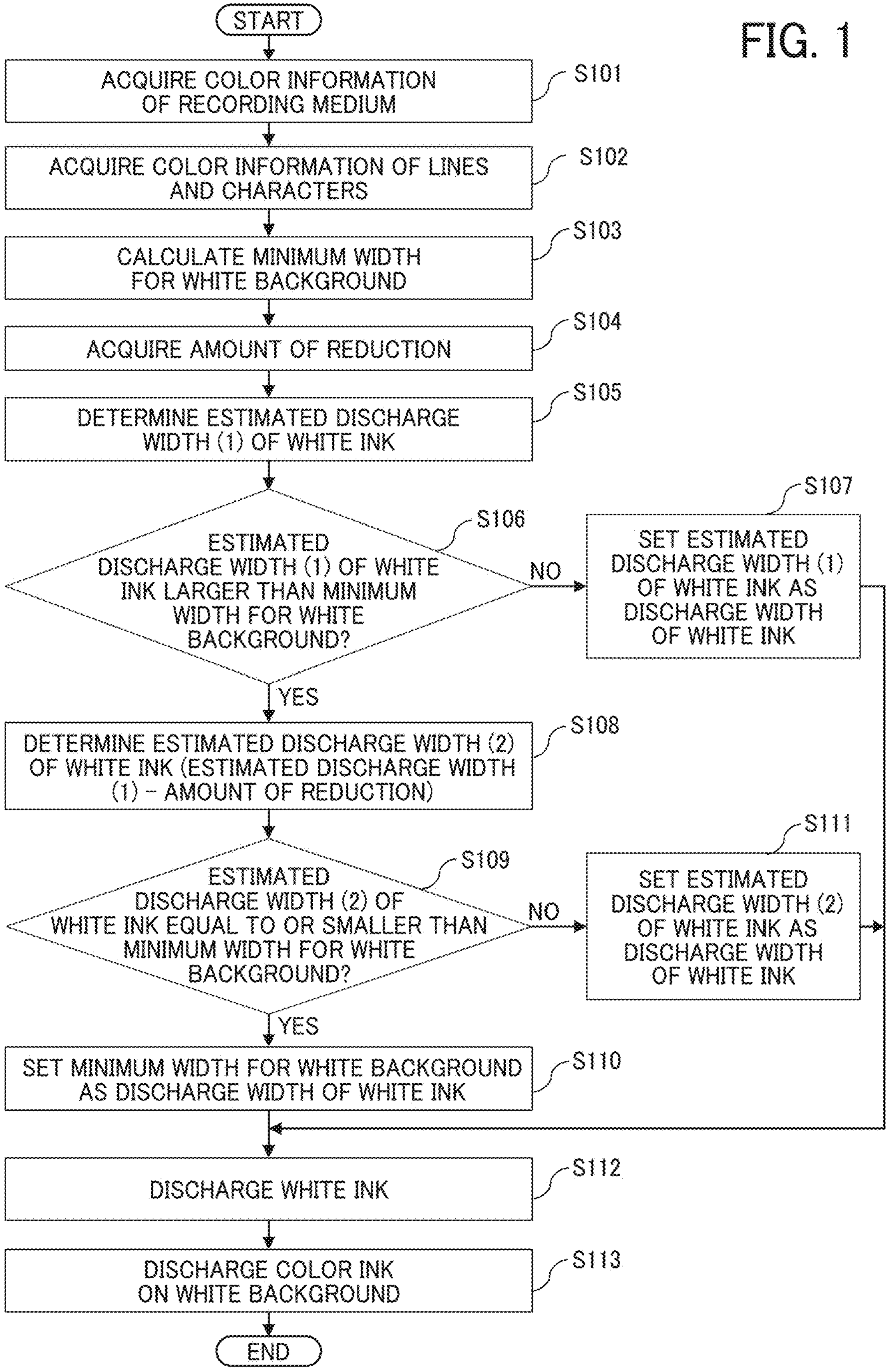
FIG. 1 is a flowchart of an image forming method according to an embodiment of the present invention.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present invention provides an image forming method that prevents a white background from being exposed around an upper layer, and further prevents thin lines or characters from becoming missing.

Hereinafter, an image forming method and an image forming apparatus according to embodiments of the present invention are described with reference to the drawings. Incidentally, it is to be noted that the following embodiments are not limiting the present invention and any deletion, addition, modification, change, etc. can be made within a scope in which person skilled in the art can conceive including other embodiments, and any of which is included within the scope of the present invention as long as the effect and feature of the present invention are demonstrated.

According to one embodiment of the present invention, an image forming method comprises a discharge step of discharging, from a liquid discharged head, a white ink onto a recording medium to form a first layer having a first width, and a color ink onto the first layer to form a second layer having a second width, wherein when the second width is equal to or smaller than a threshold, the first width is equal to the second width, and wherein when the second width is larger than the threshold, the first width is smaller than the second width.

According to another embodiment of the present invention, the above image forming method may further comprises: an estimated formation area calculation step of calculating a second area of the second layer to be formed based on image information, and a first area of the first layer, as a white background, based on the second area, to determine an estimated discharge width (1) of the white ink; a correction value acquisition step of acquiring a correction value for reducing the estimated discharge width (1) of the white ink; and a determination step of determining a discharge width of the white ink discharged in the discharge step, from the estimated discharge width (1) of the white ink, a lower-limit width for the white background that is equal to the threshold, and the correction value. In this embodiment, the lower-limit width for the white background and the estimated discharge width (1) of the white ink represent lengths in the same direction. In the determination step, the discharge width of the white ink is determined by judging whether or not the estimated discharge width (1) of the white ink is larger than the lower-limit width for the white background. In the discharge step, the white ink is discharged based on the discharge width of the white ink determined in the determining.

According to another embodiment of the present invention, an image forming apparatus comprises a liquid discharged head configured to discharge a white ink onto a recording medium to form a first layer having a first width, and a color ink onto the first layer to form a second layer having a second width, wherein when the second width is equal to or smaller than a threshold, the first width is equal to the second width, and wherein when the second width is larger than the threshold, the first width is smaller than the second width.

According to another embodiment of the present invention, an image forming apparatus comprises: a liquid discharge head configured to discharge a white ink and a color ink; and circuitry configured to cause the image forming apparatus to perform the estimated formation area calculation step, the correction value acquisition step, and the determination step.

In existing technologies, a processing for narrowing the area of white background is applied even in the case of printing thin lines or small characters. As a result, in some cases, the white background undesirably disappears, and the lines or characters become missing. In such cases, the white background is formed to have a width that is smaller than the minimum necessary width for white background, and the image quality is thereby degraded. Existing technologies have not coped with the fact that the optimum area of background differs depending on the color of the recording medium or the colors of lines or characters to be formed on the background.

The minimum necessary width for white background also varies depending on the relationship between the color of the recording medium and the color of the layer to be formed by color ink. If such a relationship is not considered, the white background might be formed to have a width smaller than the minimum width for white background. However, any existing technology has not been studied these points and has not been solved the problem of image quality degradation.

On the other hand, in the present embodiment, when the width of the second layer is equal to or less than a threshold, the width of the first layer is set equal to the width of the second layer. This secures the minimum width for white background and prevents missing of thin lines and characters. When the width of the second layer is larger than the threshold, the width of the first layer is set smaller than the width of the second layer. This prevents the white background from being exposed around the upper layer.

In the present embodiment, the white background (also referred to as "lower layer" or "first layer") is formed to have a width that does not falls below the minimum necessary width for white background (also referred to as "lower-limit width for white background" or "minimum width for white background"). This prevents missing of thin lines or small characters formed by color inks. In addition, the lower-limit width for white background (i.e., minimum width for white background) is determined based on the relationship between the color of the recording medium and the color of the layer (also referred to as "upper layer" or "second layer") to be formed by color ink. This prevents the lower layer from having a width smaller than the lower-limit width for white background. Thus, according to the present embodiment, the area of the white background is reduced in a manner that the width of the white background does not fall below the lower-limit width for white background. This prevents the white background from being exposed around the upper layer, and also prevents missing of thin lines or characters.

Hereinafter, the "lower-limit width for white background" is referred to as the "minimum width for white background".

In accordance with the following descriptions, the lower-limit width for white background means the lower-limit value in reducing (i.e., decreasing, shaving) the area of white background. The lower-limit width for white background also means the minimum width needed for forming white background. Thus, the "lower-limit width for white background" is referred to as the "minimum width for white background" in the following descriptions. In the present embodiment, the threshold to be compared with the width of the second layer corresponds to the lower-limit width for white background (i.e., minimum width for white background).

FIG. 1 is a flowchart of the image forming method according to an embodiment of the present invention.

In S101, color information of a recording medium is acquired. S101 is a first color information acquisition step in which color information of a recording medium is acquired as first color information.

The method of acquiring the first color information can be appropriately selected. For example, the first color information may be color information specified by a user. In the specifying, for example, information may be input through an input device equipped in the image forming apparatus, or information may be transmitted from another apparatus to the image forming apparatus.

In addition to the above, the method of acquiring the first color information may involve reading color information of the recording medium using a reader (e.g., sensor equipped in the image forming apparatus) and using the read color information as the first color information.

In S102, color information of lines, characters, and the like is acquired. S102 is a second color information acquisition step in which color information of the second layer is acquired, as second color information, from image information (also referred to as "image data").

The content of the first color information and the content of the second color information can be appropriately selected, and examples thereof include brightness and saturation.

In S103, the minimum width for white background is calculated. S103 is a minimum width calculation step in which the minimum width for white background is calculated using the first color information and the second color information.

For example, the minimum width for white background can be calculated using the difference (also referred to as "color difference") between the first color information and the second color information. Details of this process are described later. Examples of the color difference include, but are not limited to, a brightness difference and a saturation difference.

The minimum width for white background can be appropriately selected. For example, the minimum width for white background may represent a length in a main scanning direction or sub-scanning direction, where the main scanning direction is a scanning direction of a liquid discharge head (also referred to as "inkjet head" or "ink discharge head") and the sub-scanning direction is orthogonal to the main scanning direction.

The lower-limit width for white background (i.e., minimum width for white background) is the width necessary for the white background to prevent missing of lines, characters, and the like formed on the white background. The minimum width for white background varies depending on the relationship between the color information of the recording medium and the color information of lines, characters, and the like. Therefore, it is preferable that the relationship between the color information of the recording medium and the color information of lines, characters, and the like be taken into consideration, as in the minimum width calculation step described above.

If the relationship between the color information of the recording medium and the color information of lines, characters, and the like is not taken into consideration, the area of white background will be reduced too much in the processing for reducing the area of white background, resulting in missing of lines, characters, and the like.

S101 to S103, i.e., the first color information acquisition step, the second color information acquisition step, and the minimum width calculation step, are optional steps, and may not be performed in some cases. For example, in the case in which the minimum width for white background is preset in advance, these steps can be omitted. For example, in the case of performing monochrome printing on a black T-shirt, the minimum width for white background can be obtained by using a preset value without acquiring color information. Thus, the lower-limit width for white background (i.e., minimum width for white background) may be determined using either a preset value or a value determined in the minimum width calculation step.

In S104, an amount of reduction is acquired. S104 is a correction value acquisition step in which a correction value (i.e., the amount of reduction) is acquired. The correction value is used to reduce an estimated discharge width (1) of white ink. The step of determining the estimated discharge width (1) of white ink is described later.

In the present embodiment, when forming a background layer with white ink, a processing for reducing the estimated discharge width (1) of white ink is performed, to prevent the resultant white background layer from being exposed when the discharge position of color ink is deviated. The process of reducing the estimated discharge width (1) of white ink also serves as a process of reducing the area to be formed by the white ink. Therefore, the correction value used to reduce the estimated discharge width (1) of white ink is also referred to as the amount of reduction. Hereinafter, the correction value is mainly referred to as the amount of reduction.

The amount of reduction can be change as appropriate. For example, the amount of reduction can be specified by a user.

As the amount of reduction becomes smaller, it becomes easier to prevent the case where the discharge position of color ink is deviated and the white background is thereby exposed. However, missing of lines or characters may occur if the minimum area is not secured. The user is not limited to the user of the image forming apparatus, and may include an administrator, a designer, or the like.

The process of acquiring the amount of reduction can be appropriately selected. For example, in a case where values input by the user are stored in a memory (also referred to as "storing unit" or "saving unit"), the process may involve taking out the values. Here, the "input" may also be referred to as designation or transmission, and may be performed via another device.

In S105, the estimated discharge width (1) of white ink is determined. S105 is an estimated formation area calculation step in which an area of the second layer to be formed is determined based on image information (i.e., image data), and an area of the first layer is determined based on the second area, to determine the estimated discharge width (1) of white ink.

The area of the second layer to be formed may contain, for example, lines, characters, symbols, figures, and the like.

The second layer is to be formed by a single color ink or multiple color inks. The estimated discharge width (1) of white ink varies depending on the position of the second layer.

In a case where the main scanning direction is a scanning direction of a liquid discharge head and the sub-scanning direction is orthogonal to the main scanning direction, the minimum width for white background represents a length in the main scanning direction or the sub-scanning direction, and the estimated discharge width (1) of white ink represents a length in the same direction as the minimum width for white background.

In the present embodiment, the estimated discharge width (1) of white ink, the amount of reduction, and the minimum width for white background are all in the same direction. For example, they all represent lengths in the main scanning direction or lengths in the sub-scanning direction. Being in the same directions enables comparison of these values for judgement on whether to reduce the area of background.

The order of S101 to S105 is not limited to that illustrated in the flowchart of FIG. 1 and can be changed as appropriate as long as S103 is performed after S101 and S102.

Next, a determination step is described. The determination step is a step of determining a discharge width of white ink discharged in a discharge step, based on the estimated discharge width (1) of white ink, the minimum width for white background, and the correction value (i.e., amount of reduction). In the determination step of the present embodiment, the discharge width of white ink is determined by judging whether the estimated discharge width (1) of white ink is larger than minimum width for white background.

In S106, whether or not the estimated discharge width (1) of white ink is larger than the minimum width for white background is judged. This judgement is performed to determine whether or not the processing for reducing the area of white background can be performed with respect to the estimated discharge width (1) of white ink.

As described above, the estimated discharge width (1) of white ink is determined from the area of the first layer corresponding to the area of the second layer to be formed. Therefore, the judgement in S106 is equivalent to the process of comparing the width of the second layer with the minimum width for white background and determining whether the width of the second layer is larger than the minimum width for white background.

When the judgement result in S106 is NO, in other words, the estimated discharge width (1) of white ink is equal to or smaller than the minimum width for white background, the following processes are performed. That is, when the estimated discharge width (1) of white ink is equal to or smaller than the minimum width for white background, the estimated discharge width (1) of white ink is set as the discharge width of white ink, in S107. S107 is a step of determining the discharge width of white ink discharged in the discharge step. The discharge width of white ink is determined in the determination step, and may also be referred to as the "discharge width of white ink (after determination)".

S107 corresponds to a case where the width of the first layer to be discharged is equal to or less than the threshold, that is, a case where the width of the first layer is set equal to the width of the second layer. Setting the width of the first laver to be equal to the width of the second layer means not reducing the estimated discharge width (1) of white ink. The width of the second layer is determined from the area of the second layer to be formed.

After the discharge width of white ink is determined in the determination step, the discharge step is performed. In the discharge step, an inkjet head discharges white ink based on the discharge width of white ink (S112), and discharges color ink on the white background (S113).

Note that the first layer may be formed of multiple layers as long as it is formed of white ink.

The second layer may be formed of multiple layers as long as it is formed of color ink.

When the judgement result in S106 is YES, in other words, the estimated discharge width (1) of white ink is larger than the minimum width for white background, the following processes are performed. When the judgement result is S106 is YES, a numerical value is obtained by subtracting the amount of reduction from the estimated discharge width (1) of white ink, in S108. The numerical value obtained by subtracting the amount of reduction from the estimated discharge width (1) of white ink is also referred to as an estimated discharge width (2) of white ink.

The case where the judgement result in S106 is Yes corresponds to a case where the width of the first layer to be discharged is larger than the threshold, and the width of the first layer is set smaller than the width of the second layer. Therefore, the value of the estimated discharge width (1) of white ink is reduced, and the reduced value is set as the discharge width of white ink (after determination). As a result, the white background is prevented from being exposed around the upper layer. However, in the present embodiment, it is preferable that the estimated discharge width (2) of white ink be further compared with the minimum width for white background. This prevents excessive reduction of the area of white background, and further prevents missing of lines, characters, and the like.

Next, in S109, whether the estimated discharge width (2) of white ink is equal to or smaller than the minimum width for white background is judged. This judgement is performed to determine whether or not the width of the white background reduced by an amount corresponding to the amount of reduction is smaller than the minimum necessary width for white background.

When the judgement result in S109 is YES, in other words, when the estimated discharge width (2) of white ink) of white ink is equal to or smaller than the minimum width for white background, the following processes are performed. That is, when the estimated discharge width (2) of white ink is equal to or smaller than the minimum width for white background, the minimum width for white background is set as the discharge width of white ink (after determination), in S110. As a result, even if an attempt is made to reduce the white background more than necessary, the minimum necessary width for white background is secured, and missing of lines or characters is prevented.

When the judgement result in S109 is NO, in other words, when the estimated discharge width (2) of white ink is larger than the minimum width for white background, the following processes are performed. That is, when the estimated discharge width (2) of white ink is larger than the minimum width for white background, the estimated discharge width (2) of white ink is set as the discharge width of white ink (after determination), in S111. As a result, the white background can be reduced, for example, by an amount of reduction specified by a user.

After S110 and S111, in other words, after the discharge width of white ink is determined in the determination step, the discharge step is performed. In the discharge step, an inkjet head discharges white ink based on the discharge width of white ink (S112), and discharges color ink on the white background (S113).

In the present embodiment, whether or not to add an equal sign (=) in the judgments in S106 and S109 can be changed as appropriate. For example, the judgement in S106 may be a judgement on whether the estimated discharge width (1) of white ink is equal to or greater than the minimum width for white background. For example, the judgement in S109 may be a judgement on whether the estimated discharge width (2) of white ink is equal to or smaller than the minimum width for white background.

As described above, in the determination step, the discharge width of white ink is determined by judging whether the estimated discharge width (1) of white ink is larger than minimum width for white background. When the estimated discharge width (1) of white ink is equal to or smaller than the minimum width for white background, the estimated discharge width (1) of white ink is set as the discharge width of white ink, in S107 of the determination step.

When the estimated discharge width (1) of white ink is larger than the minimum width for white background (i.e., lower-limit width for white background), the estimated discharge width (2) of white ink is obtained by subtracting the amount of reduction from the area of the first layer to be formed, then, when the estimated discharge width (2) of white ink is equal to or smaller than the minimum width for white background, the minimum width for white background is set as the discharge width of white ink, in S106 and S108 to S110 of the determination step.

When the estimated discharge width (1) of white ink is larger than the minimum width for white background (i.e., lower-limit width for white background), the estimated discharge width (2) of white ink is obtained by subtracting the amount of reduction from the area of the first layer to be formed, then, when the estimated discharge width (2) of white ink is larger than the minimum width for white background, the estimated discharge width (2) of white ink is set as the discharge width of white ink, in S106, S108, S109, and S111 of the determination step.

Next, a specific case of printing a line with color ink on a background formed with the discharged white ink is described with reference to Table 1 and FIG. 2.

Table 1 describes three examples: Example 1 in which a line having a width of 0.5 mm is printed; Example 2 in which a line having a width of 3.0 mm is printed; and Example 3 in which a line having a width of 5.0 mm is printed. These numerical values for the width of line are described in the column of "width of line" in the table.

discharge width of white ink by using the amount of reduction. Therefore, in Example 1, the estimated discharge width (2) of white ink is not necessarily determined and presented as "-" in Table 1. Alternatively, the estimated discharge width (2) of white ink may be determined without presenting "-".

Numerical values of the minimum width for white background are also presented in the table. The minimum width for white background is determined using color information of a recording medium and color information of a laver

TABLE 1

| Example | Width of line | Estimated discharge width (1) of white ink | Reduction width of white background (Amount of reduction) | Estimated discharge width (2) of white ink | Minimum width for white background | Relationship between width of line and minimum width for white background | Relationship between estimated discharge width (2) of white ink and minimum width for white background | Description of processing | Discharge width of white ink (after deter-mination) |
|---|---|---|---|---|---|---|---|---|---|
| 1 | 0.5 mm | 0.5 mm | 2.0 mm | — | 1.5 mm | Estimated discharge width (1) of white ink ≤ Minimum width for white background | — | Set estimated discharge width (1) of white ink as discharge width of white ink | 0.5 mm |
| 2 | 3.0 mm | 3.0 mm | 2.0 mm | 1.0 mm | 1.5 mm | Estimated discharge width (1) of white ink > Minimum width for white background | Estimated discharge width (2) of white ink ≤ Minimum width for white background | Set minimum width for white background as discharge width of white ink | 1.5 mm |
| 3 | 5.0 mm | 5.0 mm | 2.0 mm | 3.0 mm | 1.5 mm | Estimated discharge width (1) of white ink > Minimum width for white background | Estimated discharge width (2) of white ink > Minimum width for white background | Set estimated discharge width (2) of white ink as discharge width of white ink | 3.0 mm |

The column of "estimated discharge width (1) of white ink" is provided in the table. The numerical values in this column are the same as the numerical values in the column of the "width of line". This means that white ink and color ink are discharged such that the area of white background and the area of a layer formed on the white background with the color ink become equal in size.

In the present embodiment, when forming the white background (i.e., first layer), a process of reducing the estimated discharge width (1) of white ink is performed. This is to prevent the white background from being exposed when the discharge position of color ink is deviated, as described above. In the table, numerical values representing the amount of reduction of the width of white background is described as "reduction width of white background (amount of reduction)".

The width of white background after the process of reducing the estimated discharge width (1) of white ink is set as "estimated discharge width (2) of white ink" as presented in the table. The estimated discharge width (2) of white ink is calculated from the following relation.

Estimated discharge width (2) of white ink=Estimated discharge width (1) of white ink−Amount of reduction Since the width of line and the estimated discharge width (1) of white ink are set equal, the following relation is also satisfied.

Estimated discharge width (2) of white ink=Width of line−Amount of reduction

As will be described in detail later, in Example 1, since the width of line is smaller than the minimum width for white background, it is not possible to reduce the estimated formed with color ink. How to determine the minimum width for white background is described later.

In the present embodiment, the width of line is determined from image information (i.e., image data), and a background corresponding to this width of line is determined using the estimated discharge width (1) of white ink (before conversion). Then, the estimated discharge width (2) of white ink is determined using the amount of reduction acquired in advance, and the discharge width of white ink is determined using the minimum width for white background calculated separately.

Examples 1 to 3 in Table 1 are described in detail below with reference to FIG. 2. The description is also made with reference to the flowchart of FIG. 1.

Figure 2A:
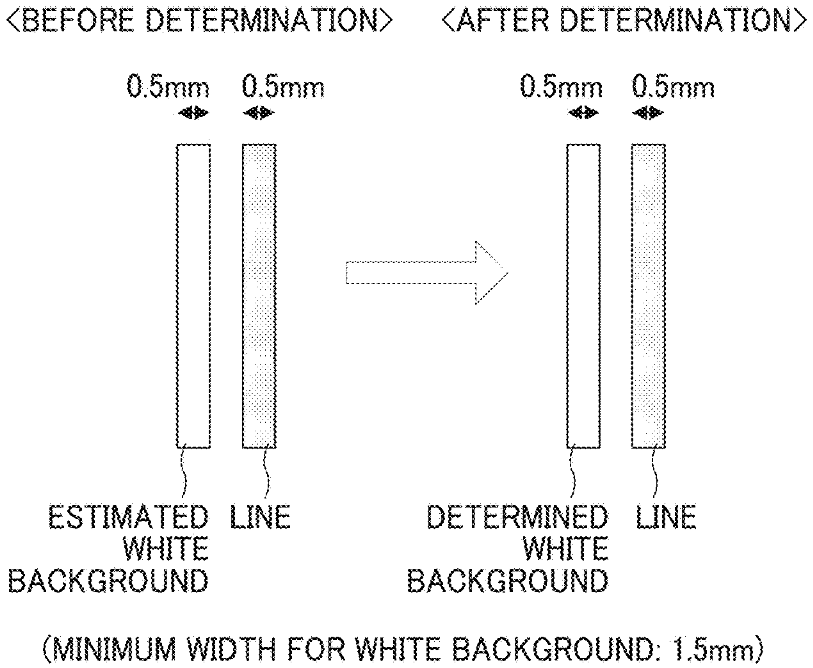
FIG. 2A is a schematic diagram for explaining a determination step according to an embodiment of the present invention.

FIG. 2A is a schematic diagram for explaining Example 1. On the left side of FIG. 2A, an estimated white background and a line formed with color ink, before the determination step, are illustrated. On the right side of FIG. 2A, a determined white background and a line formed with color ink, after the determination step, are illustrated. In the drawing, the line formed with color ink is based on image information (i.e., image data), and is not changed before and after the determination step. In the present disclosure, "before the determination step" is also simply referred to as "before determination", and "after the determination step" is also simply referred to as "after determination".

On the left side of the drawing (i.e., before determination), an area to which white ink is to be discharged is illustrated as the estimated white background. The width of this estimated white background corresponds to the estimated discharge width (1) of white ink. As described above, the estimated discharge width (1) of white ink is equal to the width of the line formed with color ink (hereinafter may be simply referred to as the "line"). The target in the determination step is the white background, and the determination is performed so that the estimated discharge width of white ink becomes small. However, as described below, in Example 1, since the estimated discharge width of white ink is not changed (i.e., the width is not reduced), the white backgrounds on the left side and the right side (i.e., before and after determination) have the same size.

As presented in the table, in Example 1, the width of line formed with color ink is 0.5 mm, and the minimum width for white background is 1.5 mm. As a result of comparison between the estimated discharge width (1) of white ink and the minimum width for white background, "estimated discharge width (1) of white ink≤minimum width for white background" is satisfied. Therefore, white ink is discharged with the estimated discharge width (1) of white ink. That is, the estimated discharge width (1) of white ink is set as the discharge width of white ink (after determination).

The above-described judgement corresponds to the judgement in S106 in the flowchart of FIG. 1. Since the judgement result is NO in Example 1, the estimated discharge width (1) of white ink is set as the discharge width of white ink in S107. As described above, since the estimated discharge width (1) of white ink is equal to the width of line formed with color ink, it is possible to compare the width of line with the minimum width for white background. The same result is delivered even in this case.

Next, an inkjet head discharges white ink based on the discharge width of white ink (after determination) (S112), and discharges color ink on the white background (S113). In Example 1, the inkjet head discharges white ink with a width of 0.5 mm, and then discharges color ink with a width of 0.5 mm on the background formed with the discharged white ink.

Thus, in Example 1, since the width of line is narrow, in other words, since the width of the area formed with white ink is smaller than the minimum width for white background, the width of white background is not reduced. As a result, in the case of a thin line, the width of white background is prevented from becoming smaller than the minimum necessary width, and undesirable phenomena such as missing of lines are prevented.

Figure 2B:
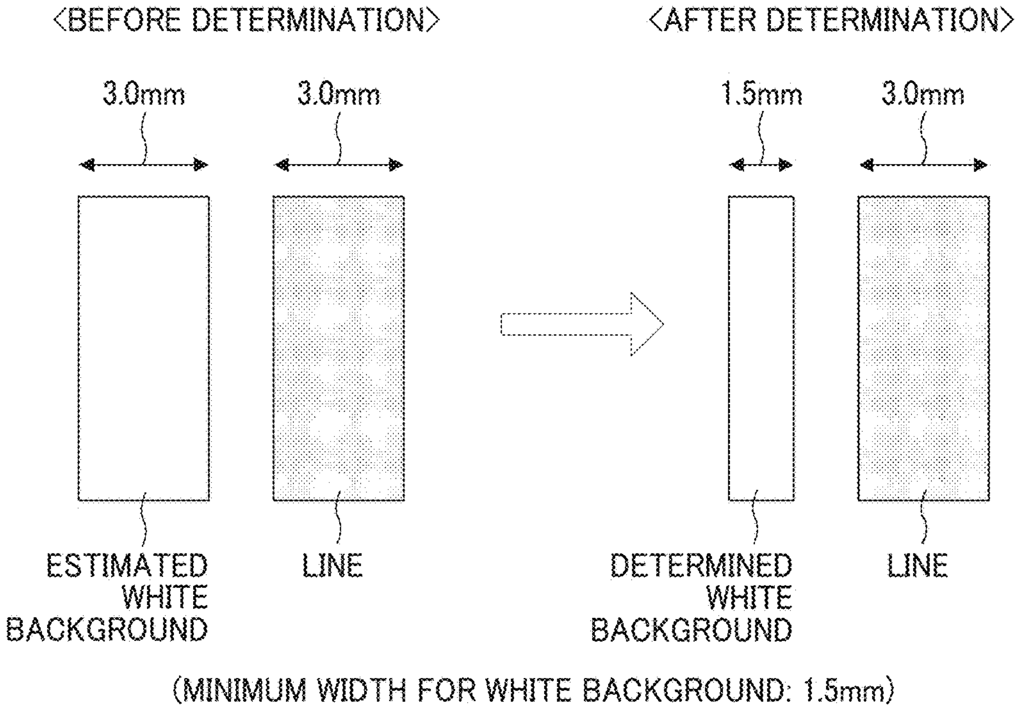
FIG. 2B is a schematic diagram for explaining a determination step according to another embodiment of the present invention.

FIG. 2B is a schematic diagram for explaining Example 2. On the left side of FIG. 2B, an estimated white background and a line formed with color ink, before the determination step, are illustrated. On the right side of FIG. 2B, a white background and a line formed with color ink, after the determination step, are illustrated.

In Example 2, since the width of line is 3.0 mm, the estimated discharge width (1) of white ink is 3.0 mm (as in Table 1 and the left side of FIG. 2B). The minimum width for white background is 1.5 mm as in Example 1. As a result of comparison between the estimated discharge width (1) of white ink and the minimum width for white background, "estimated discharge width (1) of white ink>minimum width for white background" is satisfied. Therefore, in Example 2, the judgment result in S106 is YES, and the estimated discharge width (1) of white ink can be reduced. Thus, the estimated discharge width (2) of white ink is determined by subtracting the amount of reduction from the estimated discharge width (1) of white ink (S108). In Example 2, the estimated discharge width (2) of white ink is calculated as 1.0 mm (i.e., 3.0 mm-2.0 mm).

Next, the estimated discharge width (2) of white ink is compared with the minimum width for white background (S109). In Example 2, since "estimated discharge width (2) of white ink≤minimum width for white background" is satisfied, when the white background is formed with the estimated discharge width (2) of white ink, the width becomes smaller than the minimum width for white background. If white ink is discharged with the minimum width for white background, missing of lines may occur. Thus, the minimum width for white background is set as the discharge width of white ink (after determination) (S110).

In Example 2, as illustrated on the right side of FIG. 2B, the discharge width of white ink (after determination) is 1.5 mm (i.e., the minimum width for white background). In the subsequent processing, as in Example 1, an inkjet head discharges white ink based on the discharge width of white ink (after determination) (S112), and discharges color ink on the white background (S113). In Example 2, when reducing the area of white background, the minimum width for white background can be secured for preventing missing of lines.

Figure 2C:
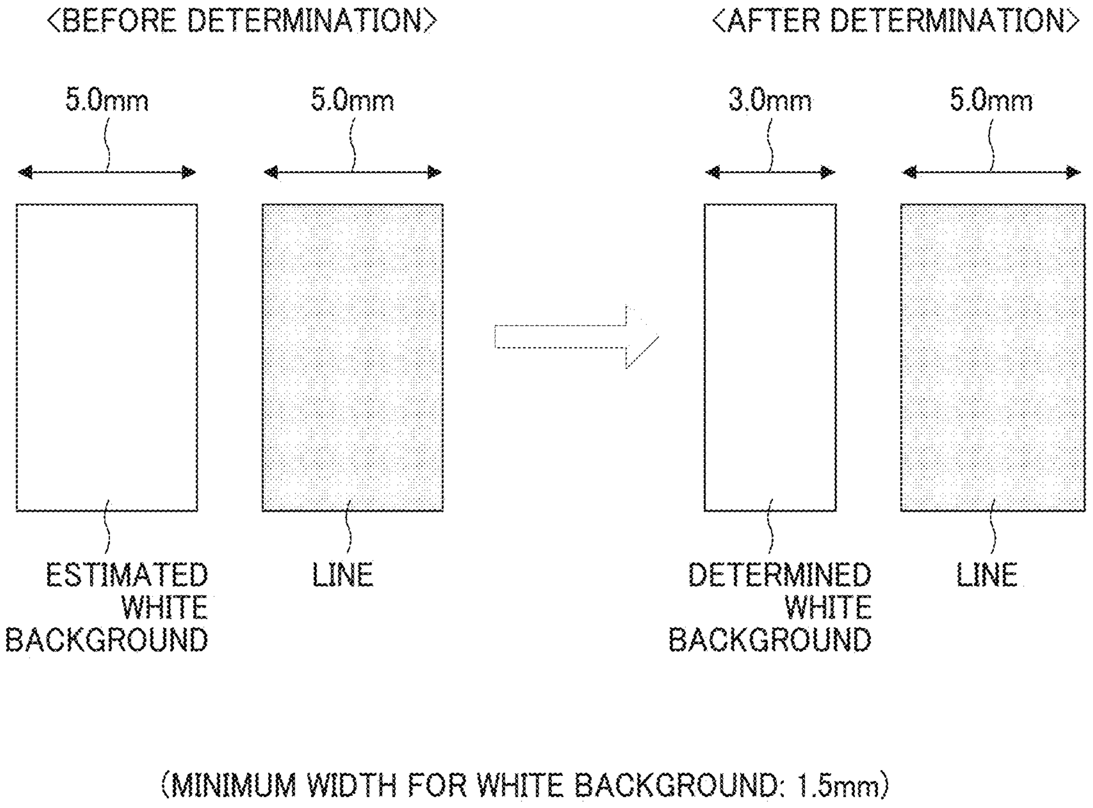
FIG. 2C is a schematic diagram for explaining a determination step according to another embodiment of the present invention.

FIG. 2C is a schematic diagram for explaining Example 3. On the left side of FIG. 2C, an estimated white background and a line formed with color ink, before the determination step, are illustrated. On the right side of FIG. 2C, a white background and a line formed with color ink, after the determination step, are illustrated.

In Example 3, since the width of line is 5.0 mm, the estimated discharge width (1) of white ink is 5.0 mm (as in Table 1 and the left side of FIG. 2C). The minimum width for white background is 1.5 mm as in Example 1. As a result of comparison between the width of line and the minimum width for white background, "estimated discharge width (1) of white ink>minimum width for white background" is satisfied, as in Example 2. Therefore, in Example 3, the judgment result in S106 is YES as in Example 2, and the estimated discharge width of white ink can be reduced. Thus, the estimated discharge width (2) of white ink is determined by subtracting the amount of reduction from the estimated discharge width (1) of white ink (S108). In Example 3, the estimated discharge width (2) of white ink is calculated as 3.0 mm (i.e., 5.0 mm-2.0 mm).

Next, the estimated discharge width (2) of white ink is compared with the minimum width for white background (S109). In Example 3, since "estimated discharge width (2) of white ink>minimum width for white background" is satisfied, even when the white background is formed with the estimated discharge width (2) of white ink, the minimum width for white background is secured. Thus, the estimated discharge width (2) of white ink is set as the discharge width of white ink (after determination) (S111).

In Example 3, as illustrated on the right side of FIG. 2C, the discharge width of white ink (after determination) is 3.0 mm (i.e., the estimated discharge width (2) of white ink). In the subsequent processing, as in Example 1, an inkjet head discharges white ink based on the discharge width of white ink (after determination) (S112), and discharges color ink on the white background (S113). In Example 3, when reducing the area of white background, the area of white background is reduced by an amount corresponding to the specified amount of reduction while the minimum width for white background is secured.

Next, a case of determining the minimum width for white background from color information of the recording medium and color information of the upper layer (second layer) is described. In the present embodiment, when determining the minimum width for white background using color information of the recording medium and color information of the upper layer, the minimum width for white background is preferably determined using the difference between the color information of the recording medium and the color information of the upper layer.

Figure 3:
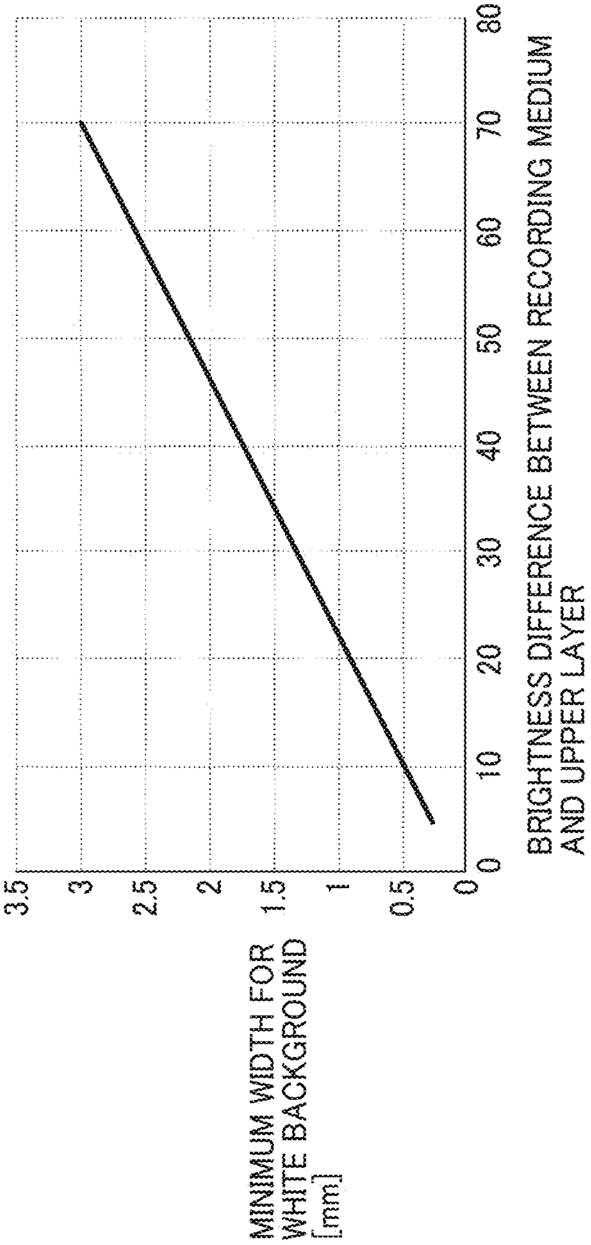
FIG. 3 is a diagram for explaining one example method of determining the minimum width for white background.

FIG. 3 is a diagram for explaining one example method of determining the minimum width for white background.

In this example, the vertical axis represents the minimum width for white background [mm], and the horizontal axis represents the brightness difference between the recording medium and the upper layer. In this example, the minimum width for white background increases as the brightness difference increases, i.e., they are in a proportional relationship.

In this example, the minimum width for white background is determined from the brightness difference between the recording medium and the upper layer, but the determination method is not limited thereto. For example, the minimum width for white background may be determined from a saturation difference. Similar to the brightness difference, the saturation difference between the recording medium and the upper layer can also be proportional to the minimum width for white background.

In this way, the minimum width for white background can be easily determined by using the brightness difference and the saturation difference.

In the present embodiment, the type of recording medium may be appropriately selected, but the recording medium is particularly preferably fabric.

Next, a specific case of printing a character is described with reference to FIGS. 4A to 7.

Figure 4A:
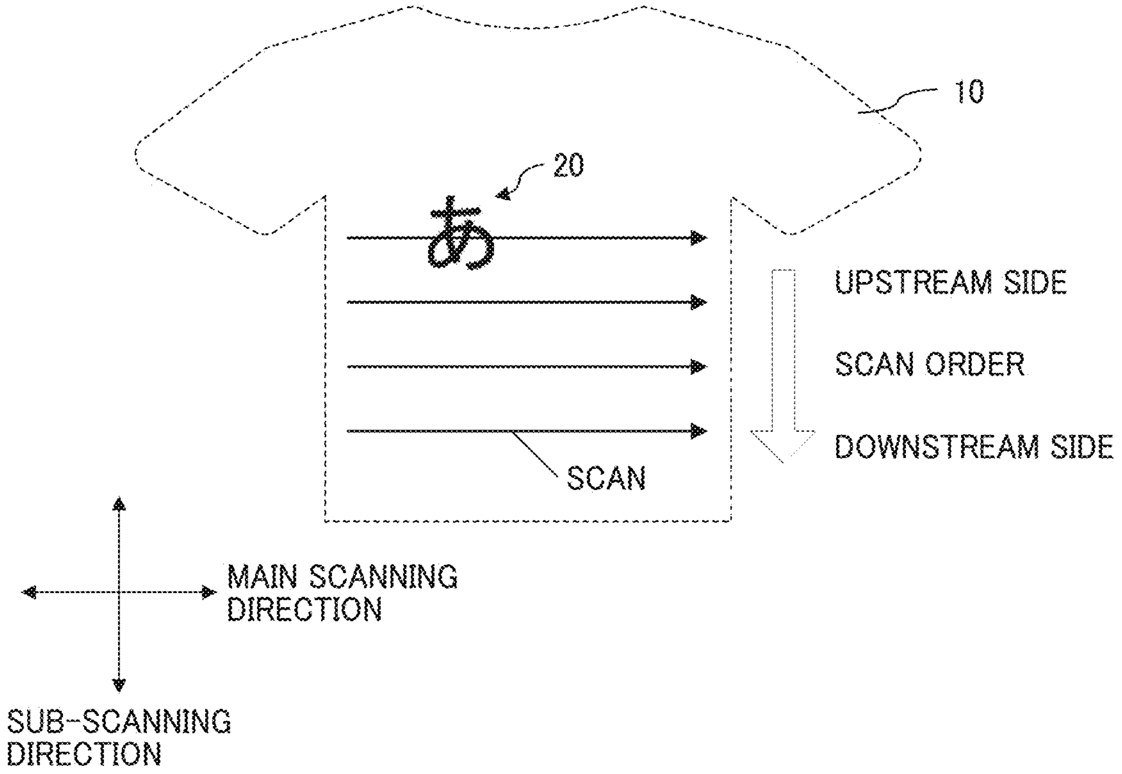
FIGS. 4A and 4B are diagrams for explaining a case of printing a character.

FIG. 4A is a schematic diagram illustrating a case in which a character 20 is formed on a recording medium 10 based on image information (i.e., image data). The image information is scanned to detect regions of lines and characters and estimate an area (second layer) where the characters are to be formed with color ink. In this example, the recording medium 10 is a shirt. The reason why the recording medium 10 is indicated by a broken line is to describe that the scanning is performed on data.

In FIG. 4A, the main scanning direction represents the scanning direction of an inkjet head, and the sub-scanning direction is orthogonal to the main scanning direction. In this example, scans are performed in the main scanning direction, as indicated by black arrows in the drawing. As illustrated in the drawing, scans are performed in a direction from the left side to the right side of the drawing. The order of scan is along the sub-scanning direction, as indicated by a white arrow in the drawing. The upstream side of the order of scan is on the upper side of the drawing. The downstream side of the order of scan is on the lower side of the drawing. The regions of the character 20 are detected by scanning the image information in this manner.

In this example, the order of scan is considered, but the present embodiment is not limited to such a case in which scans are sequentially performed. The regions of the character 20 may be detected by one time of scan. Detection may also be referred to as recognition or grasping.

Figure 4B:
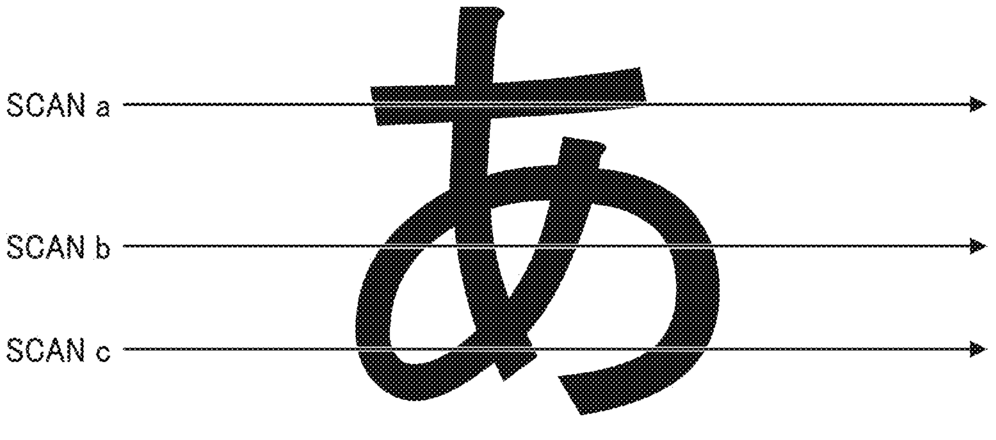

FIG. 4B is an enlarged schematic diagram illustrating the character 20 in FIG. 4A and several scans. Here, three scans a to c are presented for illustration. It is assumed that there exist other scans between the scan a and the scan b, and between the scan b and the scan c, without forming any gap therebetween.

Figure 5A:
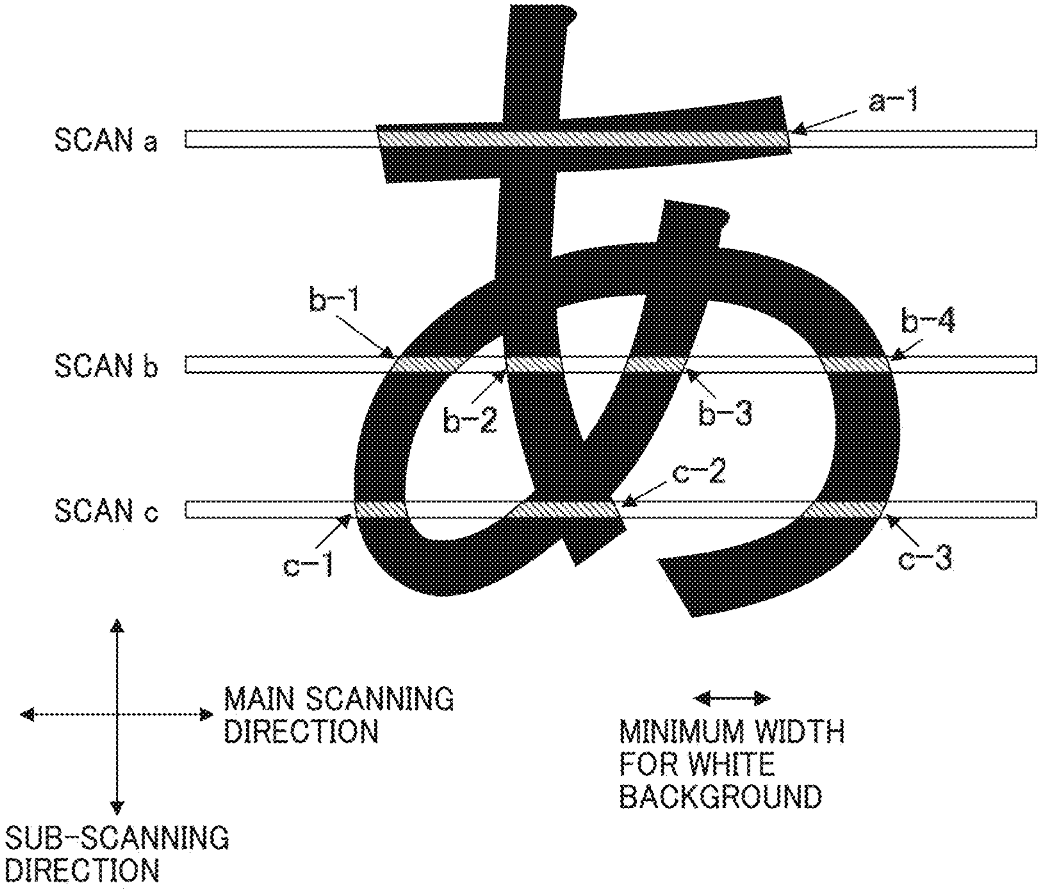
FIGS. 5A and 5B are diagrams for explaining details of FIG. 4B.

FIG. 5A a is a diagram for explaining regions recognized as character regions in the scans of FIG. 4B. In the scan a, a-1 is recognized as a character region. In the scan b, b-1 to b-4 are recognized as character regions. In the scan c, c-1 to c-3 are recognized as character regions. These regions a-1 to c-3 correspond to the area of the second layer to be formed, and the width (i.e., length) of each of them in the main scanning direction corresponds to the width of line in Table 1, that is, the estimated discharge width (1) of white ink.

In this example, the regions a-1 to c-3 are illustrated to have an angle with respect to the sub-scanning direction for the sake of explanation. When the scan width (i.e., width in the sub-scanning direction) is reduced, the character can be regarded as a set of lines.

In the drawing, the minimum width for white background is illustrated. In this example, the minimum width for white background represents a length in the main scanning direction. The lower-limit width for white background and the estimated discharge width (1) of white ink represent lengths in the same direction. The lengths of the regions a-1 to c-3 in the main scanning direction are compared with the minimum width for white background.

Figure 5B:
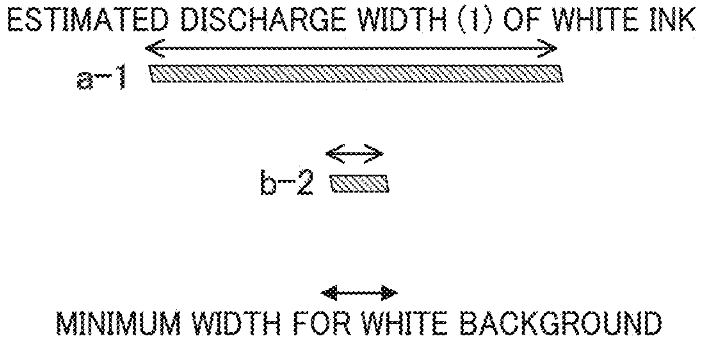

FIG. 5B is a schematic diagram for explaining comparison between the estimated discharge width (1) of white ink and the minimum width for white background. Here, a-1 and b-2 are illustrated as examples. As a result of comparison between the length of a-1 in the main scanning direction (i.e., the estimated discharge width (1) of white ink) and the minimum width for white background, the length of a-1 in the main scanning direction is larger. Therefore, the estimated discharge width (2) of white ink is determined, and the process for determining the discharge width of white ink is further performed, i.e., the processing corresponding to YES in S106. On the other hand, as a result of comparison between the length of b-2 in the main scanning direction and the minimum width for white background, the length of b-2 in the main scanning direction is smaller than the minimum width for white background. Therefore, it is not possible to reduce the estimated discharge width (1) of white ink. Thus, white ink is discharged with the length of b-2 in the main scanning direction (i.e., the estimated discharge width (1) of white ink). i.e., the processing corresponding to NO in S106. The regions other than a-1 and b-2 are compared in the same manner, to determine the discharge width of white ink.

In the above example, the regions of the first layer (i.e., background) corresponding to the second layer (i.e., characters) to be formed are detected as a-1 to c-3. These regions are regions to which color ink is to be discharged, and each of which may be referred to as "a region sandwiched between regions to which color ink is not to be discharged". A region in which lines or characters are recognized may be referred to as a region sandwiched between regions to which color ink is not to be discharged. Thus, the estimated discharge width (1) of white ink determined in the estimated formation area calculation step represents the length of the region sandwiched between regions where the second layer is not to be formed, in the main scanning direction or the sub-scanning direction.

Figure 6A:
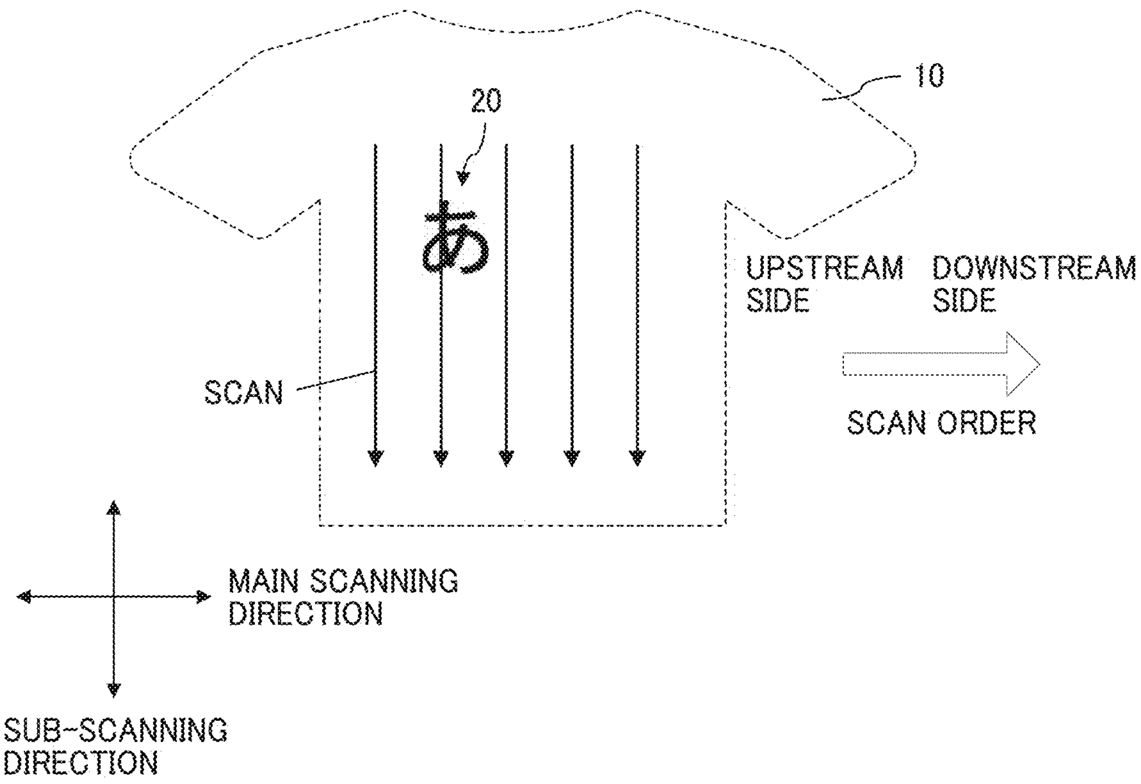
FIGS. 6A and 6B are diagrams for explaining another case of printing a character.

FIG. 6A a is a diagram for explaining another example different from the example illustrated in FIG. 4A. While FIG. 4A illustrates the example in which scans are performed in the main scanning direction, FIG. 6A illustrates an example in which scans are performed in the sub-scanning direction. As illustrated in the drawing, scanning is performed in a direction from the upper side to the lower side of the drawing. The order of scan is along the main scanning direction. The upstream side of the order of scan is on the left side of the drawing. The downstream side of the order of scan is on the right side of the drawing. The region of the character 20 is detected by scanning the image information in the same manner as above.

Figure 6B:
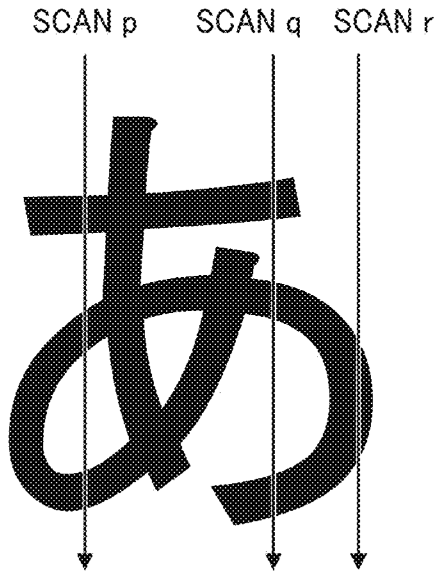

FIG. 6B is an enlarged schematic diagram illustrating the character 20 in FIG. 6A and several scans. Here, three scans p to r are presented for illustration.

Figure 7:
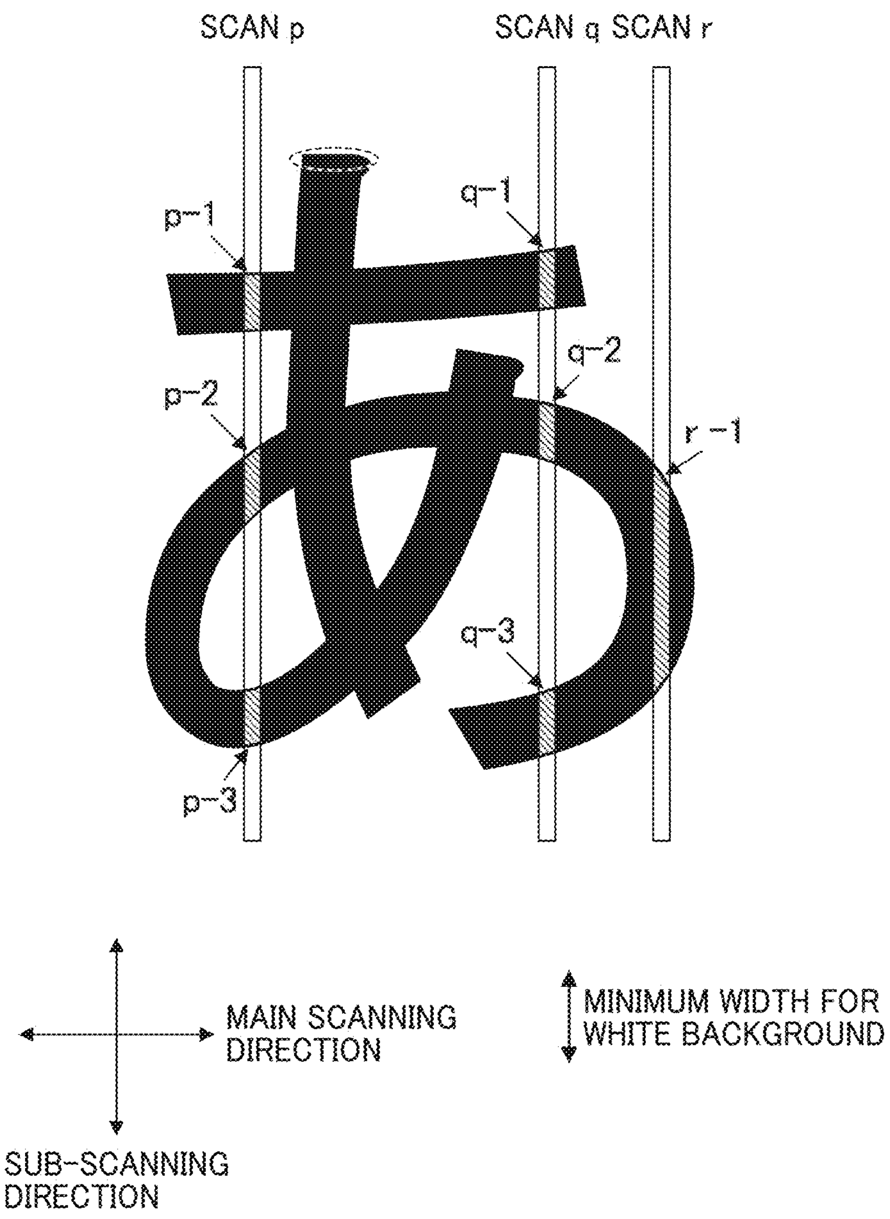
FIG. 7 is a diagram for explaining details of FIG. 6B.

FIG. 7 is a diagram for explaining regions recognized as character regions in the scans of FIG. 6B. In the scan p, p-1 to p-3 are recognized as character regions. In the scan q, q-1 to q-3 are recognized as character regions. In the scan r, r-1 is recognized as a character region. These regions p-1 to r-1 correspond to the area of the second layer to be formed, and the width (i.e., length) of each of them in the main scanning direction correspond to the width of line in Table 1, that is, the estimated discharge width (1) of white ink.

In the drawing, the minimum width for white background is illustrated. In this example, the minimum width for white background represents a length in the sub-scanning direction. The lengths of the regions p-1 to r-1 in the sub-scanning direction are compared with the minimum width for white background. Since this comparison is similar to that illustrated in FIG. 5B, an illustration is omitted here. For example, in p-1, the estimated discharge width (1) of white ink is smaller than the minimum width for white background, and the processing corresponding to NO in S106 is performed. By contrast, in r-1, the estimated discharge width (1) of white ink is larger than the minimum width for white background, and the processing corresponding to YES in S106 is performed.

As described above, the estimated discharge width (1) of white ink or the minimum width for white background may be appropriately set, for example, in the main scanning direction or the sub-scanning direction. Alternatively, they may be set in both the main scanning direction and the sub-scanning direction. For example, there may be a case in which the white background is exposed around the upper end of the character (enclosed by broken lines in FIG. 7) in the sub-scanning direction, because the white background is reduced in the main scanning direction but is not reduced in the sub-scanning direction. Such exposure of the white background can be more prevented by using both the main scanning direction and the sub-scanning direction. The directions of the estimated discharge width (1) of white ink and the minimum width for white background are not particularly limited and can be appropriately selected depending on the forms of characters and lines, the type of fabric, and the like.

Image Forming Apparatus

Next, an image forming apparatus according to an embodiment of the present invention is described in detail below.

Figure 8:
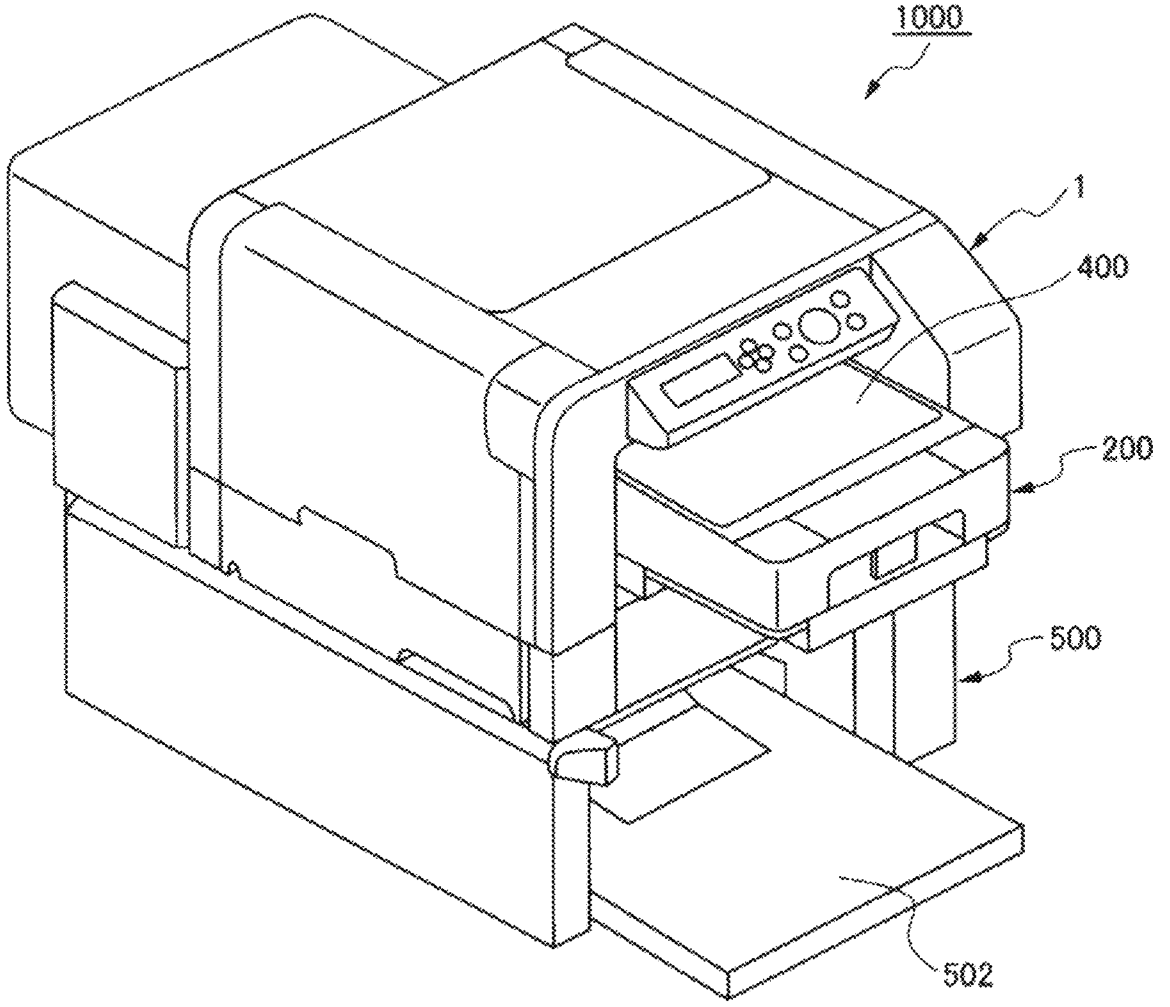
FIG. 8 is a perspective view of an image application system according to an embodiment of the present invention.

FIG. 8 is a perspective view of an image application system 1000 including an image forming apparatus 1 according to the present embodiment.

The image application system 1000 includes a cassette 200, the image forming apparatus 1, and a heating device 500. The cassette 200 holds a fabric 400 such that a portion of the fabric 400 on which an image is to be formed is kept flat. The cassette 200 is shared by both the image forming apparatus 1 and the heating device 500.

The cassette 200 (serving as a holding unit) is attachable to and detachable from the image forming apparatus 1. The image forming apparatus 1 forms an image on the fabric 400 held by the cassette 200. The cassette 200 is attachable to and detachable from the heating device 500. The heating device 500 heats the cassette 200 as a whole to heat the fabric 400, to fix the image on the fabric 400.

In this example, the image forming apparatus 1 is placed on the heating device 500. Since the image forming apparatus 1 and the heating device 500 are independent members, they may be arranged side by side, or separated from each other. The heating device 500 is an optional member provided as necessary.

The image application system 1000 applies an image to the fabric 400 as follows. First, the cassette 200 holding the fabric 400 is mounted on a stage 111 (in FIG. 9) of the image forming apparatus 1, and the image forming apparatus 1 forms an image.

After the image formation is completed, a front door 502 of the heating device 500 is opened, the cassette 200 holding the fabric 400 is taken out from the image forming apparatus 1, and the cassette 200 is mounted on the heating device 500 as it is. The heating device 500 then heats the cassette 200 as a whole to heat the fabric 400, to enable fixing of the image on the fabric 400.

An operation panel illustrated in FIG. 8 receives various types of information from a user. For example, the operation panel receives a correction value (i.e., amount of reduction) from the user, or color information of recording medium.

Next, the configuration of the image forming apparatus 1 is described with reference to FIGS. 9 to 11.

Figure 9:
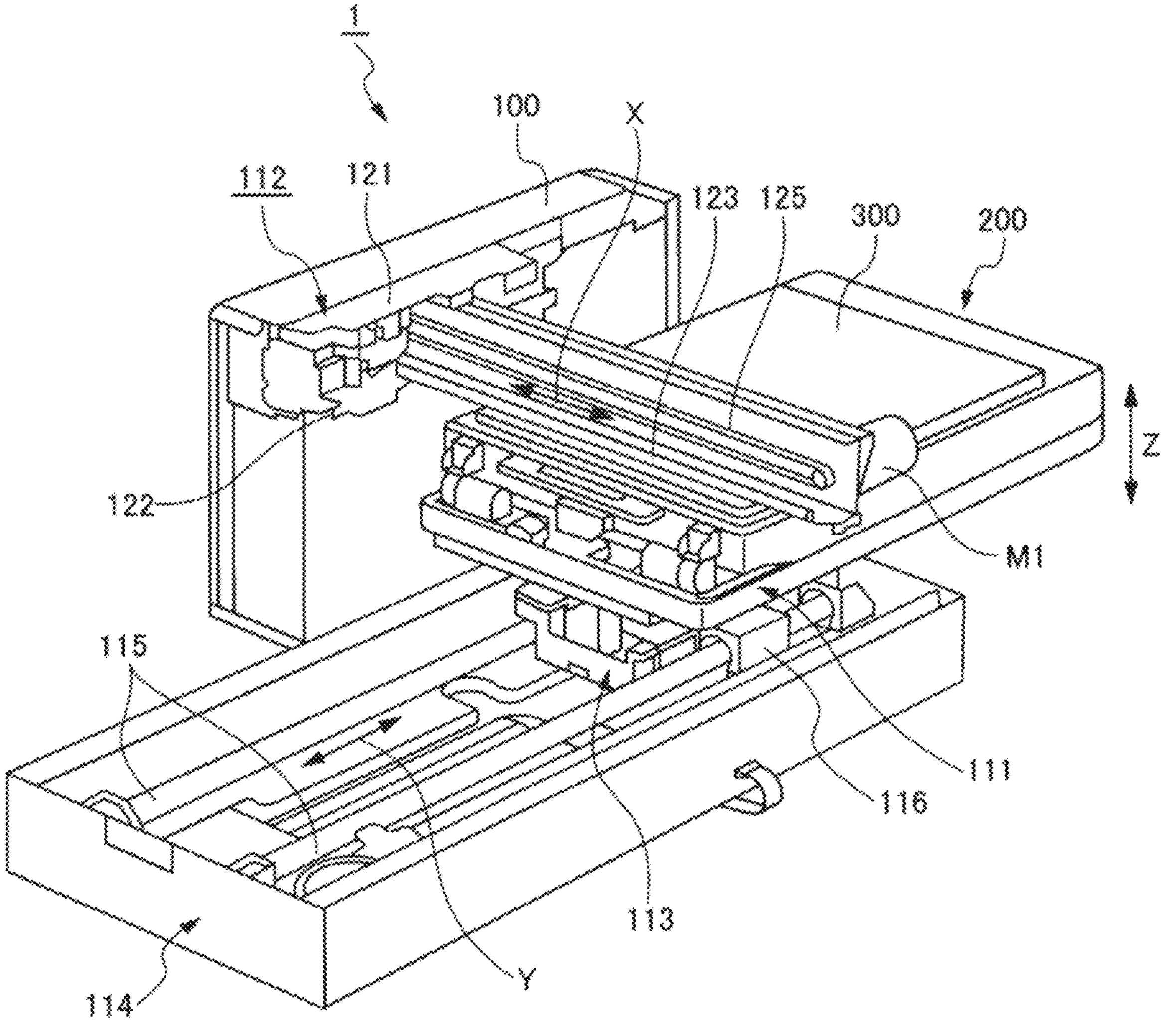
FIG. 9 is a perspective view of an image forming apparatus according to an embodiment of the present invention.
Figure 10:
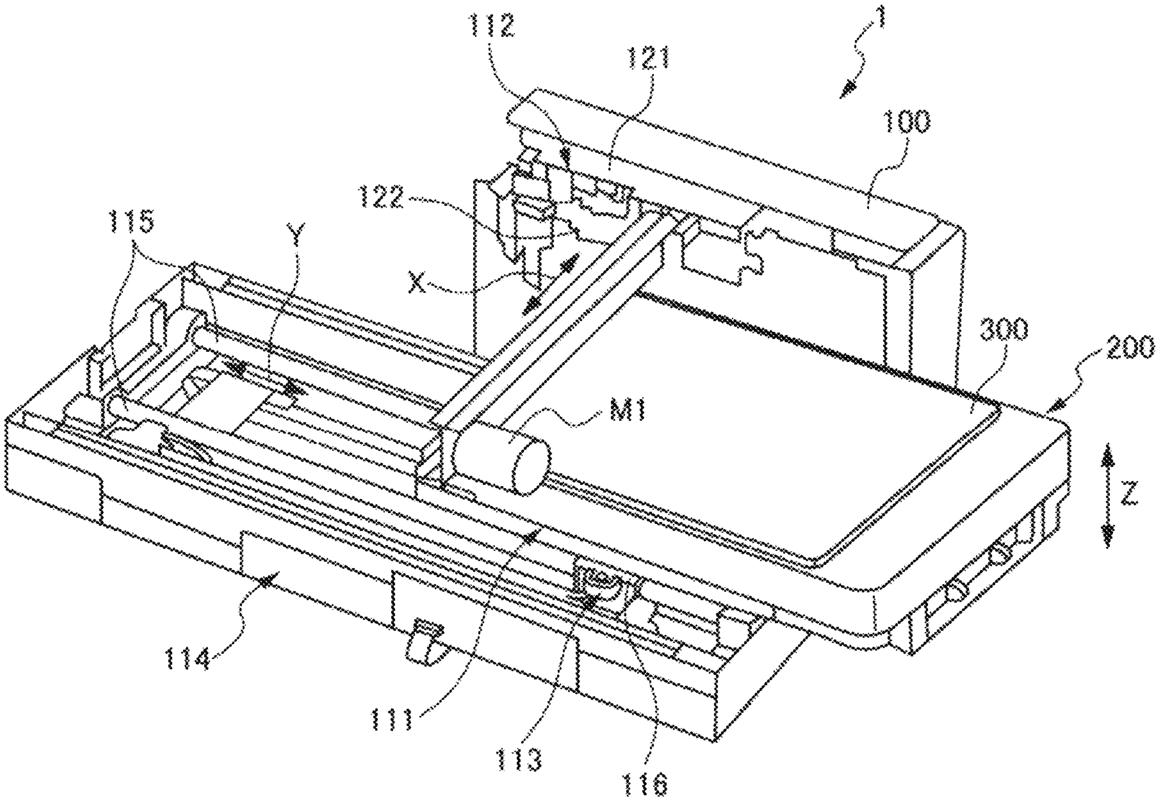
FIG. 10 is a perspective view of the image forming apparatus in FIG. 9 viewed from another direction.

FIG. 9 is a perspective view of the image forming apparatus 1. FIG. 10 is a perspective view of the image forming apparatus 1 viewed from a direction different from that in FIG. 9. FIG. 11 is a diagram illustrating a carriage 121 included in the image forming apparatus 1.

The image forming apparatus 1 includes, in an apparatus main body 100, the stage 111 that moves forward and backward while detachably holding the cassette 200 holding the fabric 400, and an image forming unit 112 that forms an image on the fabric 400 held by the cassette 200.

Here, examples of the fabric 400 (i.e., recording medium) include a fabric formed of one sheet of fabric such as a handkerchief or a towel, a fabric processed as clothing such as a T-shirt or a sweat shirt, and a fabric which constitutes a part of a product such as a tote bag.

The fabric is not particularly limited, and examples thereof include various fabrics having different weaves and materials. The fabric includes not only woven fabric but also knitted fabric, lace (i.e., a kind of knitted fabric), felt, and nonwoven fabric. Natural materials and chemical fibers can also be used, and examples thereof include silk, hemp, kudzu, and cotton.

The recording medium is not limited to fabric, and other types of recording media can also be used for printing using white ink or color ink. Specific preferred examples thereof include, but are not limited to, plastic films such as vinyl chloride resin films, polyethylene terephthalate (PET) films, polypropylene films, polyethylene films, and polycarbonate films. In addition, by adjusting the configuration of paths through which the recording medium is conveyed, ceramics, glass, and metals may be used as the recording medium.

The stage 111 is disposed on a conveyance structure 113 that is held reciprocatable in the direction indicated by arrow Y (i.e., sub-scanning direction, hereinafter "Y direction") relative to the apparatus main body 100. Specifically, the stage 111 is connected to the conveyance structure 113, and a slider 116 of the conveyance structure 113 is movably held by a conveyance guide 115 disposed along the Y direction in a bottom housing 114 of the apparatus main body 100. The stage 111 (connected to the conveyance structure 113) is reciprocated in the Y direction by a sub-scanning motor M2.

The image forming unit 112 includes the carriage 121 that moves in an X direction (i.e., main scanning direction) relative to the stage 111. The carriage 121, serving as a movable unit, is movably held by a guide 123 disposed along the X direction, and is reciprocated in the X direction by a main scanning motor M1 via a scanning mechanism such as a timing belt 125. An ink discharge head 122, serving as a liquid discharge head that discharges ink to the surface of fabric to form an image, is mounted on the carriage 121.

Figure 11:
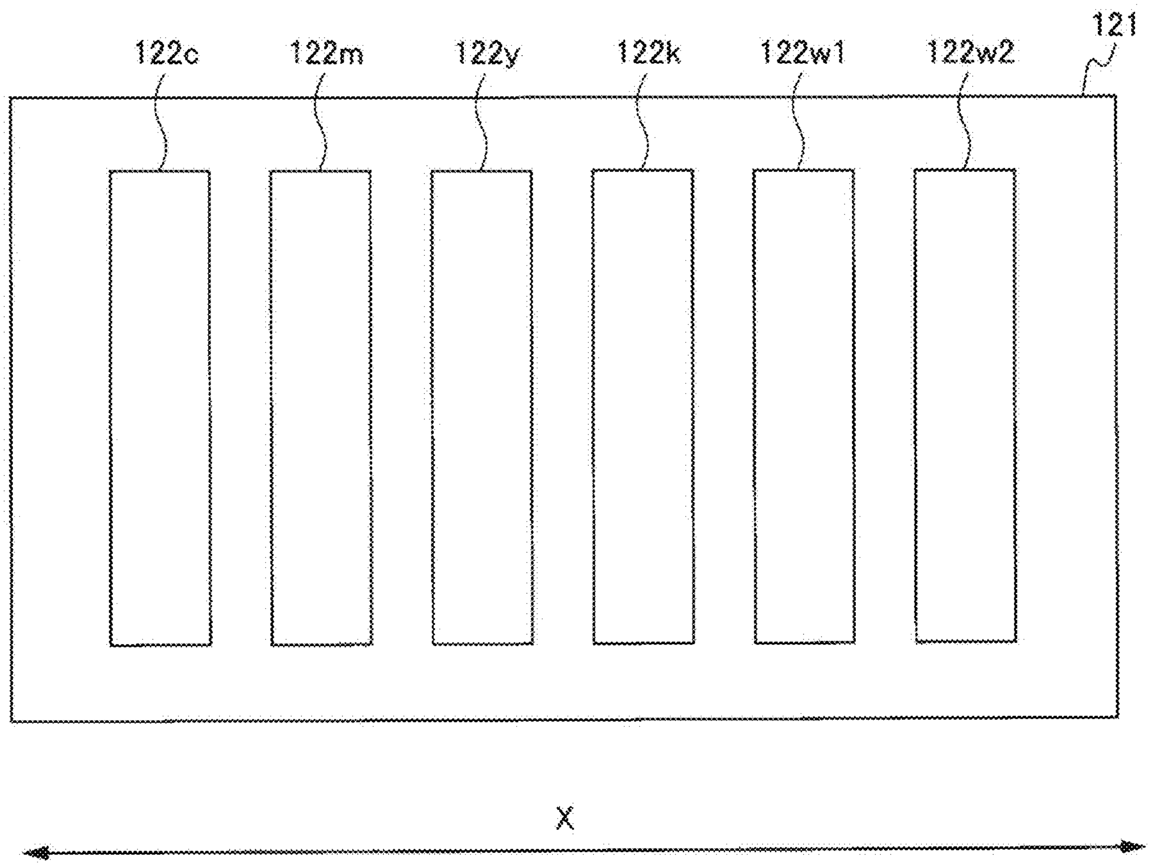
FIG. 11 is a diagram illustrating a carriage of the image forming apparatus according to the embodiment.

As illustrated in FIG. 11, multiple ink discharge heads 122*c*. 122*m*, 122*y*, 122*k*, 122*w*1, and 122*w*2 (collectively "ink discharge heads 122") are mounted on the carriage 121. The ink discharge heads 122 each include a large number of nozzles (i.e., discharge ports) for discharging ink, and are arranged in the X direction with respect to the stage 111.

The ink discharge head 122*c* discharges cyan ink, and the ink discharge head 122*m* discharges magenta ink. The ink discharge head 122*y* discharges yellow ink, and the ink discharge head 122*k* discharges black ink. Both of the ink discharge head 122*w*1 and the ink discharge head 122*w*2 discharge white ink. When the ink discharge head 122*w*1 and the ink discharge head 122*w*2 are not distinguished from each other, they are collectively referred to ink discharge heads 122*w*.

Each color ink is supplied from each tank mounted on the carriage 121 to each of the ink discharge heads 122. The colors and number of inks may be suitably selected to suit to particular application, and may be changed as necessary.

Referring back to FIGS. 9 and 10, in the image forming apparatus 1, the cassette 200 is mounted and held on the stage 111 in the apparatus main body 100, with the fabric 400 being set on a platen 300 of the cassette 200. A movement of the stage 111 in the Y direction and a reciprocation of the ink discharge head 122 in the X direction are repeated to form a desired image on the fabric 400. The platen 300 is an example of a mounting member.

The stage 111 can be elevated in a Z direction by a stage elevating motor M3. The gap between the fabric 400 and the ink discharge head 122 is adjusted by elevating the stage 111 in accordance with the thicknesses of the fabric 400. Alternatively, the image forming unit 112 equipped with the carriage 121 may be configured to be movable up and down.

Figure 12:
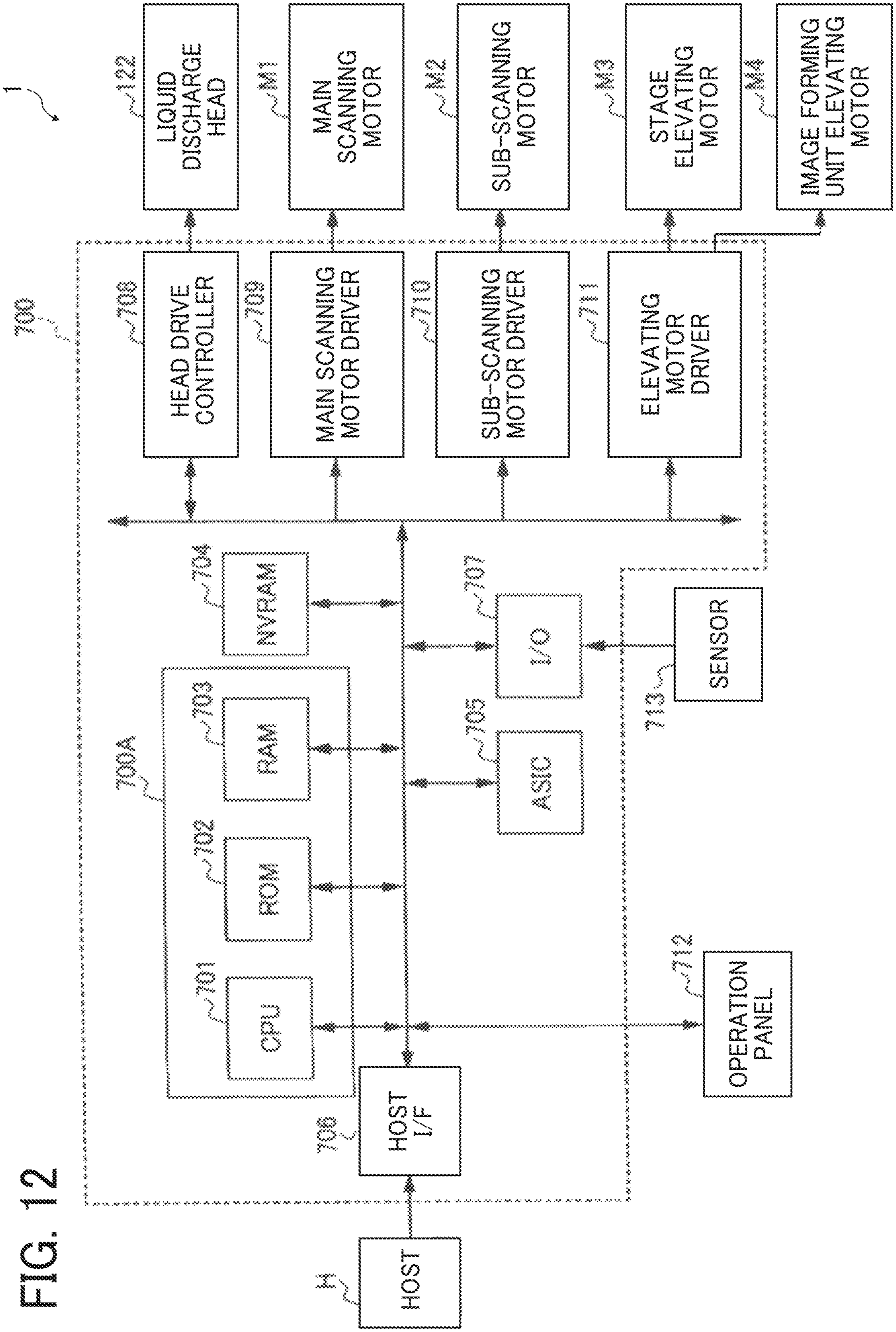
FIG. 12 is a block diagram illustrating a hardware configuration of a controller the image forming apparatus according to the embodiment.

Next, a hardware configuration of a controller 700 of the image forming apparatus 1 is described with reference to FIG. 12. FIG. 12 is a block diagram illustrating the hardware configuration of the controller 700.

The controller 700 controls the image forming apparatus 1 to discharge white ink onto a recording medium to form a first layer having a first width, and color ink onto the first layer to form a second layer having a second width, in a manner that, when the second width is equal to or smaller than a threshold, the first width is equal to the second width, and when the second width is larger than the threshold, the first width is smaller than the second width.

In addition, the controller 700 performs the estimated formation area calculation step, the correction value acquisition step, and the determination step, and may also perform the first color information acquisition step, the second color information acquisition step, and the minimum width calculation step, and further performs other various steps as necessary. Whether or not the controller 700 performs the first color information acquisition step can be appropriately selected. When the controller 700 does not perform the first color information acquisition step, the apparatus preferably includes a reading unit that performs the first color information acquisition step.

As illustrated in FIG. 12, the controller 700 includes a central processing unit (CPU) 701, a read only memory (ROM) 702, a random access memory (RAM) 703, a non-volatile RAM (NVRAM) 704, and an application specific integrated circuit (ASIC) 705.

The CPU 701 generally controls the entire image forming apparatus 1. The ROM 702 is a memory that stores programs executed by the CPU 701, and other fixed data. The RAM 703 is a memory that temporarily stores image information, print information, and the like. Here, the CPU 701, the ROM 702, and the RAM 703 constitute a main controller 700A (i.e., computer) of the image forming apparatus 1.

The NVRAM 704 is a non-volatile memory that can hold data even while the power supply of the image forming apparatus 1 is cut off. The ASIC 705 performs image processing such as various signal processing and rearrangement, and input and output signal processing for controlling the entire image forming apparatus 1.

The controller 700 further includes a host interface (I/F) 706, an input/output (I/O) 707, a head drive controller 708, a main scanning motor driver 709, a sub-scanning motor driver 710, and an elevating motor driver 711.

The host IF 706 transmits and receives data and signals to and from a host H. The head drive controller 708 generates a drive waveform for controlling the drive of the ink discharge head 122.

The main scanning motor driver 709 drives the main scanning motor M1, and the driven main scanning motor M1 moves the carriage 121 in the X direction. The sub-scanning motor driver 710 drives the sub-scanning motor M2, and the driven sub-scanning motor M2 moves the stage 111 in the Y direction.

The elevating motor driver 711 drives each of the stage elevating motor M3 and an image forming unit elevating motor M4. The stage elevating motor M3 is driven to elevate the stage 111 in the Z direction. The image forming unit elevating motor M4 is driven to elevate the image forming unit 112 in the Z direction.

The I/O 707 acquires information from a sensor 713 provided in the image forming apparatus 1, and extracts information necessary for controlling each unit of the image forming apparatus 1. An operation panel 712 for inputting and displaying various types of information is connected to the controller 700. As the sensor 713, for example, a reading unit that reads color information of recording medium can be used.

The host L/F 706 of the controller 700 receives image data from the host H, such as an information processor (e.g., personal computer (PC)), an image reader (e.g., image scanner), or an imaging device (e.g., digital camera), via a cable or a network. The CPU 701 and the ASIC 705 analyze the image data received by the host I/F 706 and generate print information.

Embodiments of the present invention further provides printed matter including a recording medium, a first layer formed of white ink, and a second layer formed of color ink on the first layer. The printed matter according to embodiments of the present invention is obtained by discharging white ink onto a recording medium to form a first layer having a first width, and color ink onto the first layer to form a second layer having a second width, in a manner that, when the second width is equal to or smaller than a threshold, the first width is equal to the second width, and when the second width is larger than the threshold, the first width is smaller than the second width.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming method comprising:

discharging, from a liquid discharged head, a white ink onto a recording medium to form a first layer having a first width, and a color ink onto the first layer to form a second layer having a second width, wherein when the second width is equal to or smaller than a threshold, the first width is equal to the second width, and wherein when the second width is larger than the threshold, the first width is smaller than the second width.

2. The image forming method according to claim 1, further comprising:

calculating a second area of the second layer to be formed based on image information, and a first area of the first layer, as a white background, based on the second area, to determine an estimated discharge width (1) of the white ink;

acquiring a correction value for reducing the estimated discharge width (1) of the white ink; and determining a discharge width of the white ink discharged in the discharging, from the estimated discharge width (1) of the white ink, a lower-limit width for the white background that is equal to the threshold, and the correction value, wherein the lower-limit width for the white background and the estimated discharge width (1) of the white ink represent lengths in the same direction, wherein, in the determining, the discharge width of the white ink is determined by judging whether or not the estimated discharge width (1) of the white ink is larger than the lower-limit width for the white background, and wherein, in the discharging, the white ink is discharged based on the discharge width of the white ink determined in the determining.

3. The image forming method according to claim 2, further comprising:

moving the liquid discharge head over the recording medium in a main scanning direction and a sub-scanning direction orthogonal to the main scanning direction, wherein the lower-limit width for the white background and the estimated discharge width (1) of the white ink represent lengths in the main scanning direction or the sub-scanning direction.

4. The image forming method according to claim 3, wherein the estimated discharge width (1) of the white ink determined in the calculating represents a length in the main scanning direction or the sub-scanning direction of a region sandwiched between regions where the second layer is not to be formed.

5. The image forming method according to claim 2, further comprising:

acquiring color information of the recording medium, as first color information;

acquiring color information of the second layer, as second color information, from the image information; and calculating the lower-limit width for the white background based on the first color information and the second color information.

6. The image forming method according to claim 5, wherein the first color information is color information specified by a user or read by a reader reading the recording medium.

7. The image forming method according to claim 5, wherein the lower-limit width for the white background is calculated from a difference in brightness between the first color information and the second color information.

8. The image forming method according to claim 5, wherein the lower-limit width for the white background is calculated from a difference in saturation between the first color information and the second color information.

9. The image forming method according to claim 2, wherein, in the determining, when the estimated discharge width (1) of the white ink is equal to or smaller than lower-limit width for the white background, the discharge width of the white ink is determined to be equal to the estimated discharge width (1) of the white ink.

10. The image forming method according to claim 2, wherein, in the determining:

when the estimated discharge width (1) of the white ink is larger than the lower-limit width for the white background, an estimated discharge width (2) of the white ink is determined by subtracting the correction value from the estimated discharge width (1) of the white ink, and when the estimated discharge width (2) of the white ink is equal to or smaller than the lower-limit width for the white background, the discharge width of the white ink is determined to be equal to the lower-limit width for the white background.

11. The image forming method according to claim 2, wherein, in the determining:

when the estimated discharge width (1) of the white ink is larger than the lower-limit width for the white background, an estimated discharge width (2) of the white ink is determined by subtracting the correction value from the estimated discharge width (1) of the white ink, and when the estimated discharge width (2) of the white ink is larger than the lower-limit width for the white background, the discharge width of the white ink is determined to be equal to the estimated discharge width (2) of the white ink.

12. The image forming method according to claim 1, wherein the recording medium is fabric.

13. An image forming apparatus comprising:

a liquid discharge head configured to discharge a white ink and a color ink; and circuitry configured to cause the image forming apparatus to perform the image forming method according to claim 2.

14. An image forming apparatus comprising:

a liquid discharged head configured to discharge a white ink onto a recording medium to form a first layer having a first width, and a color ink onto the first layer to form a second layer having a second width, wherein when the second width is equal to or smaller than a threshold, the first width is equal to the second width, and wherein when the second width is larger than the threshold, the first width is smaller than the second width.

* * * * *